March 2, 1954  S. F. HUNT  2,670,940
CONTROL APPARATUS FOR INTERNAL-COMBUSTION ENGINES
Filed Nov. 15, 1946
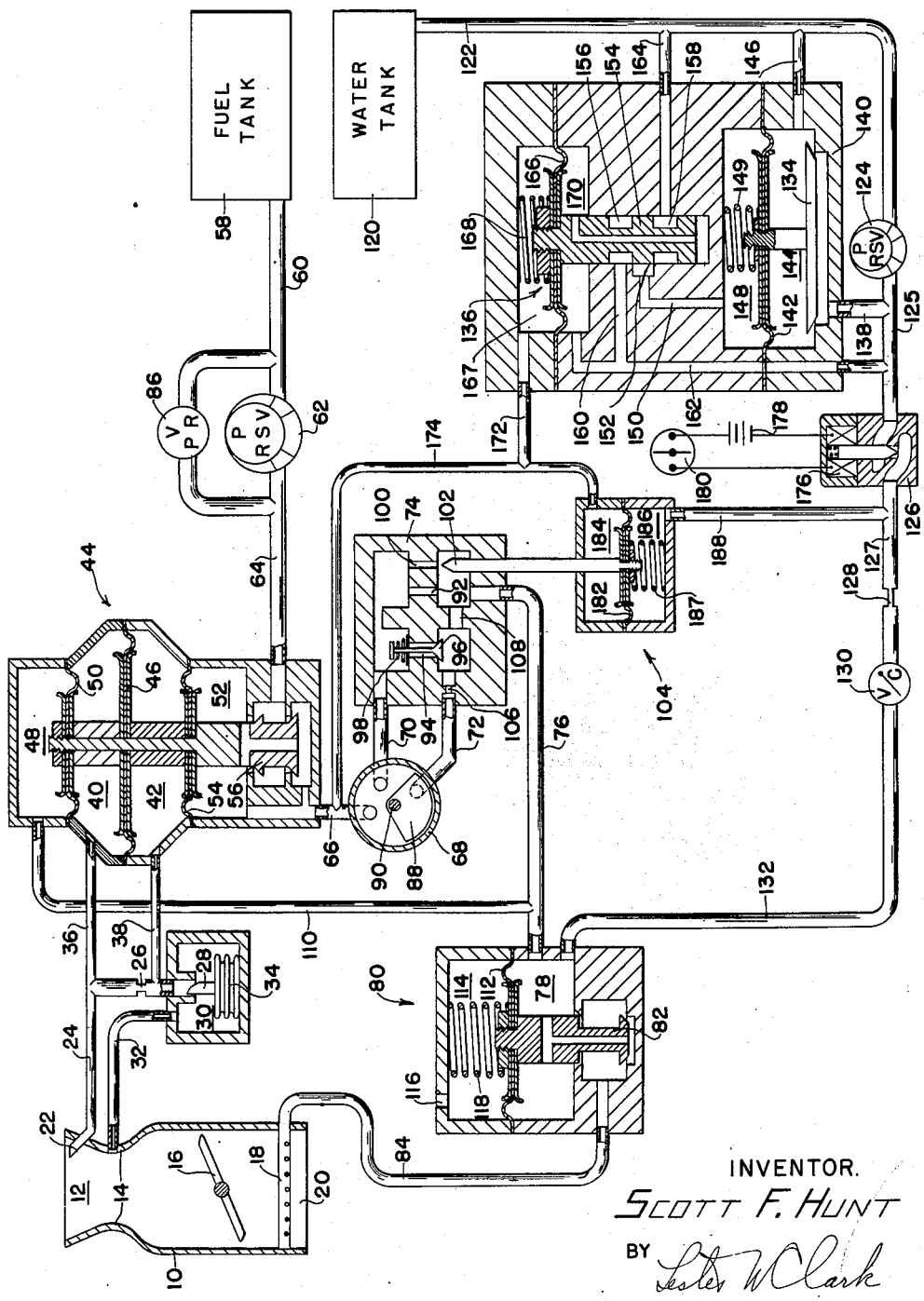
INVENTOR.
SCOTT F. HUNT
BY
AGENT Patented Mar. 2, 1954

2,670,940

UNITED STATES PATENT OFFICE 2,670,940

CONTROL APPARATUS FOR INTERNAL-COMBUSTION ENGINES

Scott F. Hunt, Meriden, Conn., assignor, by mesne assignments, to Niles-Bement-Pond Company, West Hartford, Conn., a corporation of New Jersey Application November 15, 1946, Serial No. 710,021

15 Claims. (Cl. 261—18)

This invention relates to control apparatus for internal combustion engines, and particularly to apparatus for controlling the supply of fuel and anti-detonant fluid to such engines.

It has been proposed to provide an anti-detonant fluid supply system in connection with the fuel supply systems of modern aircraft engines. Such anti-detonant fluid supply systems are not usually used continuously when the engine is running, but provision is made so that they can be turned on or off at the will of the operator. Such systems are used whenever the engine is operating at extremely high power outputs. Under such conditions, detonation is particularly likely to occur, with resulting damage to the engine.

In such anti-detonant fluid supply systems, it has been proposed to provide some control mechanism so that the flow of anti-detonant fluid will be proportional to the flow of fuel. The particular proportion is predetermined and maintained by the system whenever it is in operation. The fuel system is usually constructed to supply a very rich mixture whenever the anti-detonant fluid supply system is not in operation. Therefore, it is customary to provide means, commonly termed a derichment valve, to reduce the fuel-air ratio whenever the anti-detonant fluid supply system is in operation.

It is therefore an object of the present invention to provide an improved and simplified fuel and anti-detonant fluid supply system for an internal combustion engine.

Another object is to provide, in such a system improved means for controlling the anti-detonant fluid flow in proportion to the fuel flow.

A further object is to provide, in such a system, improved derichment valve means.

Other objects and advantages of the present invention will become apparent from a consideration of the appended specification, claims and drawing.

Referring to the drawing, there is shown at 10 a portion of an air supply conduit for an internal combustion engine. Combustion air enters the conduit at an entrance 12, and flows past a Venturi restriction 14, a throttle 16, and a fuel nozzle 18, to a discharge outlet 20.

Air flowing through the venturi 14 sets up a pressure differential therein which is a measure of the volumetric rate of flow of air to the engine. This pressure differential induces a flow of air through a secondary air passage which may be traced from an impact tube 22 through a conduit 24, a restriction 26, past a valve 28, into a chamber 30, and through a conduit 32 to the throat of venturi 14. The valve 28 is operated by a bellows 34. The bellows 34 is filled with a fluid having an appreciable coefficient of thermal expansion so as to give it a temperature response characteristic. The bellows 34 then responds both to the temperature and pressure of the combustion air flowing to the engine. It operates the valve 28 so that the pressure differential appearing across restriction 26 is a measure of the mass rate of flow of air to the engine. This air density compensating mechanism is more completely described and claimed in the patent to Milton E. Chandler, No. 2,393,144, dated January 15, 1946.

The air pressure differential appearing across restriction 26 is communicated through conduits 36 and 38 to chambers 40 and 42 in a fuel flow regulating valve mechanism generally indicated at 44.

The chambers 40 and 42 are separated by a flexible diaphragm 46. The valve mechanism 44 also includes a chamber 48 separated from chamber 40 by a flexible diaphragm 50 and a chamber 52 separated from chamber 42 by a flexible diaphragm 54. The diaphragms 50, 46, and 54 are connected at their centers to the stem of a valve 56.

Fuel for the engine comes from a tank 58 and flows through a conduit 60, a fuel transfer pump 62, usually driven by the engine, past valve 56 into chamber 52, and thence through conduit 66, a mixture control valve 68, conduits 70 and 72, a jet system 74, a conduit 76, a chamber 78 in a pressure regulator generally indicated at 80, past a valve 82 in the pressure regulator 80 and through a conduit 84 to the discharge nozzle 18.

The pump 62 is provided with a pressure relief valve 86, which maintains a substantially constant pump discharge pressure.

The mixture control 68 includes a disc valve 88 fixed on a shaft 90. When the disc valve 88 is in the position shown in the drawing, fuel then can flow to the jet system only through the conduit 70. This is known as the lean position of the mixture control. The valve 88 is movable to a position wherein both the conduits 70 and 72 are open to the flow of fuel. This is shown as the rich position of the mixture control. The valve 88 is also movable to a position wherein the flow through both conduits 70 and 72 is cut off. This is known as the cut-off position.

Fuel entering the jet system 74 through the conduit 70 may pass through either a fixed restriction 92, a restriction 94 controlled by an enrichment valve 96, which is biased to closed position by a spring 98, or through a restriction 100 controlled by a valve 102, which is part of a derichment valve mechanism generally indicated at 104. Fuel entering the jet system 74 through conduit 72 passes through a fixed restriction 106. Fuel flowing thru the restrictions 94 and 106 also passes through another restriction 108.

The chamber 48 in the fuel regulation valve mechanism 44 is connected through a conduit 110 to the main fuel conduit 76 on the downstream side of the jet system 74. In the fuel regulating valve mechanism 44, the air pressure differential across restriction 26, which is a measure of the rate of flow of air to the engine, acts downwardly on the diaphragm 46 and hence on the valve 56. The fuel pressure differential across the jet system 74, which for a given fuel metering area in that jet system, is a measure of the rate of flow of fuel to the engine, acts upwardly on the valve 56; since the high pressure component of the fuel pressure differential acts upwardly on diaphragm 54, while the low pressure component acts downwardly on diaphragm 50. The valve 56 is therefore controlled in accordance with the balance between the air and fuel pressure differentials, and regulates the fuel flow to maintain a balance between those two differentials.

When the mixture control is in the lean position, the restriction 92 is the main metering restriction, and determines the relationship between the fuel pressure differential and the rate of flow of fuel. When the mixture control is in its rich position, the restriction 106 is connected in parallel with restriction 92. A new relationship between the fuel pressure differential and the fuel flow is then established, such that a greater fuel flow is obtained for a given pressure differential. The enrichment valve 96 opens when the fuel pressure differential exceeds a value determined by the strength of the spring 98, thereby increasing the fuel-air ratio when the fuel pressure differential is above that value. The enrichment valve is provided to give a richer mixture at high engine power outputs. Such a rich mixture tends to prevent detonation and to make the engine run cooler. The restriction 108 is provided to limit the maximum flow which can take place thru restriction 106 and the enrichment valve 96.

Under normal operating conditions, the restriction 108 is open in parallel with restriction 92 and with it determines the fuel-air ratio. The restriction 108 is closed by the valve 102 under conditions to be described later in connection with the anti-detonant fluid supply system.

The pressure regulator 80 includes a diaphragm 112 separating the chamber 78 from a chamber 114. The chamber 114 is vented, as illustrated at 116. The central portion of diaphragm 112 is attached to the stem of valve 82. Valve 82 is biased toward closed position by a spring 118.

The pressure regulator 80 functions to maintain a substantially constant pressure in the chamber 78. If the pressure in chamber 78 increases above that constant value, the diaphragm 112 rises, compressing spring 118 and opening valve 82 wider. This movement continues until the valve 82 is opened sufficiently to restore the pressure in chamber 78 to its desired value. This pressure will not be absolutely constant, but will vary therefrom slightly because of the regulation of spring 118.

The anti-detonant fluid, which may be water, a water-alcohol mixture, or other suitable fluid, comes from a tank 120, and flows through a conduit 122, a pump 124, a conduit 125, a solenoid valve 126, a metering restriction 128, a check valve 130, and a conduit 132 to the chamber 78 in pressure regulator 80.

The pump 124 may either be engine driven or driven by a special motor, electric or otherwise, provided for that purpose.

The discharge pressure of pump 124 is controlled by a relief valve 134. The relief valve 134 is in turn controlled by a pilot valve mechanism generally indicated at 136.

The conduit 125 at the discharge side of pump 124 is connected through a conduit 138 to a chamber 140 located under the valve 134. The valve 134 is connected by a stem to a balancing diaphragm 142. The valve 134 separates chamber 140 from a chamber 144 connected through a conduit 146 to the pump inlet conduit 122. The diaphragm 142 separates chamber 144 from a chamber 148 connected through a conduit 150 to a port 152 adjacent a pilot valve 154, which is a part of the pilot valve mechanism 136.

The pilot valve 154 is of the spool valve type, and is provided with recesses 156 and 158 on opposite sides of a land which, in the position shown in the drawing, blocks the port 152. The recess 156 registers with a port leading through conduits 160 and 162 to the pump discharge conduit 125. The recess 158 registers with a port leading through a conduit 164 to the pump inlet conduit 122.

The pilot valve 154 is attached to a diaphragm 166, which separates a pair of expansible chambers 167 and 170. Chamber 167 is connected through conduits 172 and 174 to the main fuel conduit 66 on the upstream side of the jet system 74. Chamber 170 is connected through the conduit 162 to the pump discharge conduit 125.

The solenoid valve 126 is biased to closed position and is opened by energization of a solenoid coil 176. The coil 176 is connected in a series circuit with a battery 178 and a single pole snap switch 180. The switch 180 is manually operable to open or close the solenoid valve at will.

The derichment valve mechanism 104 includes a diaphragm 182 separating expansible chambers 184 and 186. Chamber 184 is connected through conduit 174 to the main fuel line 66 on the upstream side of the jet system 74. Chamber 186 is connected through conduit 188 to conduit 127 in the anti-detonant fluid supply line on the upstream side of the metering restriction 128.

The check valve 130 is provided in the anti-detonant fluid supply line to prevent backward flow of fluid into the anti-detonant fluid system in case the fluid supply should become exhausted.

The energizing circuit for coil 176 is normally de-energized so that valve 126 is normally closed. The pump 124 is normally continuously running when the engine is running, whether a supply of anti-detonant fluid is required or not. Whenever the pump 124 is running, whether the valve 126 is open or closed, the pilot valve 136 regulates relief valve 134 so that the discharge pressure at pump 124 is exactly the same as the pressure on the upstream side of the jet system 74. The pump discharge pressure is communicated to chamber 140 where it acts upwardly on the underside of valve 134. This upward force is opposed by the downward force of spring 149 and the downward force of the pressure in chamber 148. The diaphragm 142 is so designed that its effective area is equal to that of valve 134. When it is so designed, the pressure in chamber 144 acts upwardly on diaphragm 142 and downwardly on the equal effective area of valve 134, and therefore does not affect the position of valve 134.

The pressure in chamber 148 is controlled by the pilot valve mechanism 136. This pilot valve mechanism 136 includes the valve 154 which is positioned by diaphragm 166 subject on its upper side to a pressure equal to that in the fuel line on the upstream side of the jet system and on its lower side to the discharge pressure at pump 124. As long as these two pressures are balanced, the diaphragm 166 and pilot valve 154 remain in the position shown in the drawing. If the pump discharge pressure becomes greater than the fuel pressure on the upstream side of the jet system, then the valve 154 is moved upwardly. This opens a fluid connection from the chamber 148 through conduit 150, port 152, recess 158 and conduit 164 to the pump inlet conduit 122. The pump discharge pressure acting upwardly on valve 134 then forces diaphragm 142 upwardly, and forces fluid from chamber 148 out through the connection just traced to the pump inlet. This upward movement of valve 134 reduces the pump discharge pressure. As soon as the valve 134 has moved upwardly enough to reduce the pump discharge pressure to a value equalling the fuel pressure on the upstream side of the jet system, then diaphragm 166 is again balanced and valve 154 is restored to its neutral position as shown in the drawing. This closes the pressure relieving connection from chamber 148 and thereby fixes the position of valve 134 at the position which produces balance between the pump discharge pressure and the fuel pressure on the upstream side of the jet system.

In a similar manner, if the pump discharge pressure falls below the fuel pressure on the upstream side of the jet system, pilot valve 154 moves downwardly, opening a connection for supplying fluid at the pump discharge pressure through conduits 162 and 160, recess 156, port 152 and conduit 150 to the chamber 148. The chamber 148 then expands, moving valve 134 downwardly until the pump discharge pressure is thereby increased sufficiently to again balance diaphragm 166.

It may therefore be seen that the pilot valve 136 controls relief valve 134 to regulate the pump discharge pressure at a value equal to the fuel pressure on the upstream side of the jet system. It should be further noted that these two pressures are maintained exactly equal by the system, and that the regulation of spring 149 does not enter into the balance between the two pressures. If spring 168 is used to act on valve 154, the two pressures will not be exactly equal, but the pump discharge pressure will be slightly higher, as required to balance the spring 168. However, the proportionality between the two pressures will not be affected by spring 168, since under steady state conditions, its deflection is always the same.

When the solenoid valve 126 is open by operation of the switch 180, then the anti-detonant fluid flows through metering restriction 128 and check valve 130 to chamber 78. Since the discharge pressure of pump 124, which is substantially the same as the pressure on the upstream side of metering restriction 128, is maintained exactly equal to the pressure on the upstream side of the jet system 74, it may be seen that a definite ratio is maintained between the fuel flow and the anti-detonant fluid flow. The pressures on the downstream side of the jet system and on the downstream side of the metering orifice 128 are the same.

When the solenoid valve 126 is open, the pressure on the upstream side of metering restriction 128 is communicated through conduit 188 to chamber 186 in the derichment valve mechanism 104. The pressure in chamber 184 of the derichment valve mechanism is always the same as the pressure on the upstream side of the jet system. Since these two pressures are maintained equal by the pump discharge pressure control mechanism, then as long as the solenoid valve 126 is open, the only force acting on diaphragm 182 is that of spring 187, which accordingly moves valve 102 to closed position. This decreases the fuel flow by an amount to compensate for the increased flow of anti-detonant fluid through metering restriction 128.

If the solenoid valve is then closed, or if the supply of anti-detonant fluid fails for any reason, then the pressure in chamber 186 falls until it is substantially equal to that on the downstream side of jet system 74. At least, it can be no higher than that pressure, since if it were higher, check valve 130 would open until the pressure was reduced to the required value. The pressure in chamber 184, however, still remains equal to the pressure on the upstream side of the fuel jet system 74, and therefore the full fuel pressure differential acts on diaphragm 182 downwardly against spring 187 and opens the valve 102. Hence, if the water supply system should fail, the derichment valve 102 will be operated in a safe direction, to increase the enrichment of the fuel-air mixture.

The terms and expressions which I have employed are used as terms of description and not of limitation, and I have no intention in the use of such terms and expressions, of excluding any equivalent of the features shown and described or portions thereof, but recognize that various modifications are possible within the scope of the appended claims.

I claim as my invention:

1. A fuel and anti-detonant fluid supply system for an internal combustion engine, comprising a conduit for fuel flowing to said engine, a fuel metering restriction in said fuel conduit, means for maintaining a substantially constant pressure on one side of said restriction, means for regulating the fuel pressure on the opposite side of said restriction to control the fuel pressure differential across said restriction and hence the rate of flow of fuel to said engine, a conduit for anti-detonant fluid flowing to said engine, a pump for forcing anti-detonant fluid thru said last-mentioned conduit, a fluid metering restriction in said fluid conduit downstream from said pump, a relief valve for regulating the pump discharge pressure, a pilot valve for controlling said relief valve, and means directly subjected to said discharge pressure and to said regulated fuel pressure for controlling said pilot valve to maintain said pump discharge pressure proportional to said regulated fuel pressure and thereby to maintain said anti-detonant fluid flow proportional to said fuel flow.

2. A fuel and anti-detonant fluid supply system for an internal combustion engine, comprising a conduit for fuel flowing to said engine, a fuel metering restriction in said fuel conduit, means for maintaining a substantially constant pressure on the downstream side of said restriction, means for regulating the fuel pressure on the upstream side of said restriction to control the fuel pressure differential across said restriction and hence the rate of flow of fuel to said engine; a conduit for anti-detonant fluid flowing to said engine and delivering said fluid into said fuel conduit at the downstream side of said restriction; a pump for forcing anti-detonant fluid thru said last-mentioned conduit, a fluid metering restriction in said fluid conduit downstream from said pump; a relief valve for regulating the pump discharge pressure; a pilot valve for controlling said relief valve; and means directly subjected to said discharge pressure and to said regulated fuel pressure for controlling said pilot valve to maintain said pump discharge pressure proportional to said regulated fuel pressure and thereby to maintain said anti-detonant fluid flow proportional to said fuel flow.

3. A fuel and anti-detonant fluid supply system for an internal combustion engine, comprising a conduit for fuel flowing to said engine, means for regulating the fuel pressure in a portion of said conduit in accordance with the rate of flow of fuel to said engine, a conduit for anti-detonant fluid flowing to said engine, a pump for forcing anti-detonant fluid thru said last-mentioned conduit, a fluid metering restriction in said fluid conduit downstream from said pump, means for maintaining a substantially constant fluid pressure on the downstream side of said restriction, and pump by-pass relief valve means directly subjected to said regulated fuel pressure for regulating the pump discharge pressure to maintain said pump discharge pressure proportional to said regulated fuel pressure and thereby to maintain said anti-detonant fluid flow proportional to said fuel flow.

4. A fuel and anti-detonant fluid supply system for an internal combustion engine, comprising a conduit for fuel flowing to said engine having a metering restriction therein, a conduit for anti-detonant fluid flowing to said engine, a pump for forcing anti-detonant fluid thru said last-mentioned conduit, a fluid metering restriction in said fluid conduit downstream from said pump, means for maintaining a substantially constant fluid pressure on the downstream side of said restrictions, and pump by-pass relief valve means directly subjected to the unmetered fuel pressure in said fuel conduit for maintaining the discharge pressure of said pump proportional to said unmetered fuel pressure, whereby said anti-detonant fluid flow is proportional to said fuel flow.

5. A fuel and anti-detonant fluid supply system for an internal combustion engine, comprising a conduit for combustion air flowing to said engine; a conduit for anti-detonant fluid flowing to said engine, a pump for forcing anti-detonant fluid thru said last-mentioned conduit, a fluid metering restriction in said fluid conduit downstream from said pump, means for maintaining a substantially constant fluid pressure on the downstream side of said restriction, and pump by-pass relief valve means responsive to the rate of mass flow of combustion air to said engine for controlling the discharge pressure of said pump so as to maintain said anti-detonant fluid flow constantly proportional to said air flow.

6. A fuel and anti-detonant fluid supply system for an internal combustion engine, comprising a conduit for fuel flowing to said engine, fuel metering restriction means in said conduit, means for maintaining a substantially constant pressure on the downstream side of said fuel metering restriction means, means for regulating the fuel pressure on the upstream side of said restriction means to control the flow of fuel to said engine, a conduit for anti-detonant fluid flowing to said engine and delivering into said fuel conduit at the downstream side of said fuel metering restriction, a fluid metering restriction in said fluid conduit, means for regulating the pressure on the upstream side of said fluid metering restriction, a derichment valve effective upon movement from open to closed position to decrease the area of said fuel metering restriction means, means biasing said derichment valve to closed position, a diaphragm attached to said valve, means for subjecting one side of said diaphragm to said regulated fuel pressure so that said regulated fuel pressure acts on said diaphragm in a direction to open said valve, and means for subjecting the opposite side of said diaphragm to said regulated fluid pressure.

7. A fuel and anti-detonant fluid supply system for an internal combustion engine, comprising a conduit for fuel flowing to said engine, fuel metering restriction means in said conduit, means for maintaining a substantially constant pressure on the downstream side of said fuel metering restriction means, means for regulating the fuel pressure on the upstream side of said restriction means to control the flow of fuel to said engine, a conduit for anti-detonant fluid flowing to said engine and delivering into said fuel conduit at the downstream side of said fuel metering restriction, a pump for forcing anti-detonant fluid thru said last-mentioned conduit, a fluid metering restriction in said fluid conduit downstream from said pump; a relief valve for regulating the pump discharge pressure; a pilot valve for controlling said relief valve, and means directly subjected to said discharge pressure and to said regulated fuel pressure for controlling said pilot valve to maintain said pump discharge pressure proportional to said regulated fuel pressure and thereby to maintain said anti-detonant fluid flow proportional to said fuel flow, a derichment valve effective upon movement from open to closed position to decrease the area of said fuel metering restriction means, means biasing said derichment valve to closed position, a diaphragm attached to said valve, means for subjecting one side of said diaphragm to said regulated fuel pressure so that said regulated fuel pressure acts on said diaphragm in a direction to open said valve, and means for subjecting the opposite side of said diaphragm to said regulated fluid pressure.

8. A fuel and anti-detonant fluid supply system for an internal combustion engine, comprising a conduit for fuel flowing to said engine, fuel metering restriction means in said conduit, means for regulating the fuel pressure in a portion of said conduit in accordance with the rate of flow of fuel to said engine, a conduit for anti-detonant fluid flowing to said engine, a fluid metering restriction in said fluid conduit, means for maintaining a substantially constant fluid pressure on the downstream side of said fluid metering restriction, means for regulating the pressure on the upstream side of said fluid metering restriction, a derichment valve effective upon movement from open to closed position to decrease the area of said fuel metering restriction means, means biasing said derichment valve to closed position, a diaphragm attached to said valve, means for subjecting one side of said diaphragm to said regulated fuel pressure so that said regulated fuel pressure acts on said diaphragm in a direction to open said valve, and means for subjecting the opposite side of said diaphragm to said regulated fluid pressure.

9. A fuel and anti-detonant fluid supply system for an internal combustion engine, comprising a conduit for fuel flowing to said engine, fuel metering restriction means in said conduit, means for regulating the fuel pressure in a portion of said conduit in accordance with the rate of flow of fuel to said engine, a conduit for anti-detonant fluid flowing to said engine, a fluid metering restriction in said fluid conduit, means for maintaining a substantially constant fluid pressure on the downstream side of said fluid metering restriction, means for regulating the pressure on the upstream side of said fluid metering restriction, a derichment valve effective upon movement from open to closed position to decrease the area of said fuel metering restriction means, means biasing said derichment valve to closed position, and operating means for said valve subject to said regulated fuel pressure acting in a valve opening direction and to said regulated fluid pressure acting in a valve closing direction.

10. A fuel and anti-detonant fluid supply system for an internal combustion engine, comprising a conduit for fuel flowing to said engine, fuel metering restriction means in said conduit, means for regulating the fuel pressure in a portion of said conduit in accordance with the rate of flow of fuel to said engine, a conduit for anti-detonant fluid flowing to said engine, a fluid metering restriction in said fluid conduit, means for maintaining a substantially constant fluid pressure on the downstream side of said fluid metering restriction, means for regulating the pressure on the upstream side of said fluid metering restriction, a derichment valve effective upon movement from open to closed position to decrease the area of said fuel metering restriction means, and operating means for said valve subject to said regulated fuel pressure acting in a valve opening direction and to said regulated fluid pressure acting in a valve closing direction.

11. A fuel and anti-detonant fluid supply system for an internal combustion engine, comprising a conduit for fuel flowing to said engine, fuel metering restriction means in said conduit, means for maintaining a substantially constant pressure on the downstream side of said fuel metering restriction means, means for regulating the fuel pressure on the upstream side of said restriction means to control the flow of fuel to said engine, a conduit for anti-detonant fluid flowing to said engine and delivering into said fuel conduit at the downstream side of said fuel metering restriction, a pump for forcing anti-detonant fluid thru said last-mentioned conduit, a fluid metering restriction in said fluid conduit downstream from said pump, means for regulating the pump discharge fuel pressure in response to said discharge pressure and to said regulated fuel pressure to maintain said pump discharge pressure proportional to said regulated pressure and thereby to maintain said anti-detonant fluid flow proportional to said fuel flow, a derichment valve effective upon movement from open to closed position to decrease the area of said fuel metering restriction means, means biasing said derichment valve to closed position, and operating means for said valve responsive to the difference between said regulated fuel pressure and said regulated fluid pressure, said regulated fuel pressure acting in a valve opening direction and said regulated fluid pressure acting in a valve closing direction.

12. A fuel and anti-detonant fluid supply system for an internal combustion engine, comprising a conduit for fuel flowing to said engine, fuel metering restriction means in said conduit, means for regulating the fuel pressure in a portion of said conduit in accordance with the rate of flow of fuel to said engine, a conduit for anti-detonant fluid flowing to said engine, a pump for forcing anti-detonant fluid thru said last-mentioned conduit, a fluid metering restriction in said fluid conduit downstream from said pump, means for maintaining a substantially constant pressure on the downstream side of said fluid metering restriction, means for regulating the pump discharge pressure in response to said discharge pressure and to said regulated fuel pressure to maintain said pump discharge pressure proportional to said regulated fuel pressure and thereby to maintain said anti-detonant fluid flow proportional to said fuel flow, a derichment valve effective upon movement from open to closed position to decrease the area of said fuel metering restriction means, means biasing said derichment valve to closed position, and operating means for said valve responsive to the difference between said regulated fuel pressure and said regulated fluid pressure, said regulated fuel pressure acting in a valve opening direction and said regulated fluid pressure acting in a valve closing direction.

13. A fuel and anti-detonant fluid supply system for an internal combustion engine, comprising a conduit for fuel flowing to said engine, fuel metering restriction means in said conduit, means for regulating the fuel pressure in a portion of said conduit in accordance with the rate of flow of fuel to said engine, a conduit for anti-detonant fluid flowing to said engine, a fluid metering restriction in said fluid conduit, means for maintaining a substantially constant fluid pressure on the downstream side of said fluid metering restriction, means for controlling the pressure on the upstream side of said fluid metering restriction, an anti-detonant fluid cut-off valve between said pressure controlling means and said restriction, a derichment valve effective upon movement from open to closed position to decrease the area of said fuel metering restriction means, means biasing said derichment valve to closed position, and operating means for said valve subject to said regulated fuel pressure acting in a valve opening direction and to the anti-detonant fluid pressure between said cut-off valve and said fluid metering restriction acting in a valve closing direction.

14. A fuel and anti-detonant fluid supply system for an internal combustion engine, comprising a conduit for fuel flowing to said engine, fuel metering restriction means in said conduit, means for regulating the fuel pressure in a portion of said conduit in accordance with the rate of flow of fuel to said engine, a conduit for anti-detonant fluid flowing to said engine, a pump for forcing anti-detonant fluid thru said last-mentioned conduit, a fluid metering restriction in said fluid conduit downstream from said pump, means for maintaining a substantially constant pressure on the downstream side of said fluid metering restriction, means for regulating the pump discharge pressure in response to said discharge pressure and to said regulated fuel pressure to maintain said pump discharge pressure proportional to said regulated pressure and thereby to maintain said anti-detonant fluid flow proportional to said fuel flow, a cut-off valve between said pump and said restriction, a derichment valve effective upon movement from open to closed position to decrease the area of said fuel metering restriction means, means biasing said derichment valve to closed position, and operating means for said valve responsive to the difference between said regulated fuel pressure and the fluid pressure between said cut-off valve and said restriction, said regulated fuel pressure acting in a valve opening direction and said fluid pressure acting in a valve closing direction.

15. A system for mixing two fluids in predetermined proportions, comprising a first conduit for a first fluid, metering restriction means in said conduit, means for regulating the flow of said first fluid in said conduit, a second conduit for a second fluid delivering into said fuel conduit at the downstream side of said metering restriction means, a pump for forcing said second fluid thru said second conduit, a fluid metering restriction in said second fluid conduit downstream from said pump, a relief valve for regulating the pump discharge pressure, a pilot valve for controlling said relief valve, and means directly subjected to said discharge pressure and to said regulated fuel pressure for controlling said pilot valve to maintain said pump discharge pressure proportional to said regulated fuel pressure and thereby to maintain said second fluid flow proportional to said first fluid flow.

SCOTT F. HUNT.

References Cited in the file of this patent

UNITED STATES PATENTS

| Number | Name | Date |
| --- | --- | --- |
| Re. 22,447 | Hersey et al. | Feb. 29, 1944 |
| 2,397,984 | Schorn | Apr. 9, 1946 |
| 2,431,590 | Smith | Nov. 25, 1947 |
| 2,447,793 | Bolt et al. | Aug. 24, 1948 |
| 2,553,145 | Palmer | May 1, 1951 |